United States Patent [19]
Binder et al.

[11] Patent Number: 5,625,418
[45] Date of Patent: Apr. 29, 1997

[54] METHOD AND ARRANGEMENT FOR INSERTING FRAME MARKERS IN DATA FOR TRANSMISSION AND FOR RETRIEVING THE DATA WITH THE AID OF SUCH FRAME MARKERS

[75] Inventors: Jann Binder, Aspach; Georg Süssmeier, Backnang; Klaus Krull, Weissach; Wolfgang Bambach, Oberstenfeld; Karlheinz Grotz, Fellbach, all of Germany

[73] Assignee: ANT Nachrichtentechnik GmbH, Backnang, Germany

[21] Appl. No.: 431,287

[22] Filed: Apr. 28, 1995

[30] Foreign Application Priority Data

Apr. 30, 1994 [DE] Germany .................. 44 15 288.4

[51] Int. Cl.$^6$ .................................. H04N 7/52
[52] U.S. Cl. .................. 348/495; 370/514; 348/464
[58] Field of Search .................. 348/467, 465, 348/495, 388, 389, 464, 518; 375/365, 368; 370/105.1, 105.4; H04N 7/52

[56] References Cited

U.S. PATENT DOCUMENTS 5,136,587  8/1992  Obana et al. .................. 370/105.4
5,202,886  4/1993  Rossi et al. .................... 370/105.1
5,442,405  8/1995  Taniguchi et al. .............. 370/105.4
5,502,748  3/1996  Wilkinson ...................... 370/105.4

FOREIGN PATENT DOCUMENTS 3725060  2/1989  Germany .................... H04N 7/00
4008201  9/1991  Germany .
4136112  5/1993  Germany .

OTHER PUBLICATIONS

Sklar, Bernard *Digital Communications, Fundamentals and Applications*, Prentice Hall, 1988, pp. 429–519.
Zander, Horst *Analog–Digital Wandler in der Praxis* Verlag Markt & Technik, 1983, pp. 83–85.

*Primary Examiner*—Victor R. Kostak
*Attorney, Agent, or Firm*—Spencer & Frank

[57] ABSTRACT

For the preparation of data such as digitized television channel signals or television channel bundles, useful data are periodically replaced by a frame marker (F) in at least one of N parallel partial data streams of different bit significance. For this replacement, a partial data stream of low bit significance is selected because there the degradation is lowest. Because of this measure, the bit rate does not have to be increased in order to include a frame marker and a simple structure is possible for the multiplexer and demultiplexer at the respective transmission interfaces.

17 Claims, 4 Drawing Sheets

FIG. 3

| data | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
|  |  |  |  |  |  |  |  |  |  |  |  |  |  |  |  | frame FO |
| i1 | L0 | L1 | L2 | L3 | L4 | L5 | L6 | L7 | L8 | L9 | L10 | L11 | L12 | L13 | L14 | 0 |
| i2 | L16 | L17 | L18 | L19 | L20 | L21 | L22 | L23 | L24 | L25 | L26 | L27 | L28 | L29 | L30 | 1 |
| i3 | L32 | L33 | L34 | L35 | L36 | L37 | L38 | L39 | L40 | L41 | L42 | L43 | L44 | L45 | L46 | 0 |
| i4 |  |  |  |  |  |  |  |  |  |  |  |  |  |  |  | 1 |
| i5 |  |  |  |  |  |  |  |  |  |  |  |  |  |  |  | 0 |

METHOD AND ARRANGEMENT FOR INSERTING FRAME MARKERS IN DATA FOR TRANSMISSION AND FOR RETRIEVING THE DATA WITH THE AID OF SUCH FRAME MARKERS

CROSS-REFERENCE TO RELATED APPLICATIONS

This application claims the right of priority of Application No. P 44 15 288.4 filed in Germany on Apr. 30, 1994, the disclosure of which is incorporated herein by reference.

BACKGROUND OF THE INVENTION

The invention relates to a method of preparing data, in particular, digitized television channel signals or television channel signal bundles for transmission purposes, a method of retrieving such data, and arrangements for implementing these methods.

In broad-band communication networks, source signals, for example, a plurality of television channel signals, are subjected to analog-to-digital conversion and combined to form a serial data stream having a high bit rate. See for example German Patent documents DE 40 08 201 A1 and DE 41 36 112 A1. The source signals can be multiplexed into a frame as disclosed in DE 41 36 112 A1. On the receiving end, a corresponding reconversion of the useful signals then takes place.

SUMMARY OF THE INVENTION

It is an object of the present invention to provide a method of preparing and retrieving data in a broad-band communication system which involves a simple synchronization.

The above and other objects are accomplished in accordance with the invention by the provision of a method of preparing digital data for transmission, comprising: providing the digital data in a form of parallel partial data streams of different bit significance; and periodically replacing useful data in at least one partial data stream of low bit significance with a frame marker.

According to a further aspect of the invention, there is provided a method of retrieving digital data in a form of parallel partial data streams of different bit significance from a serial data stream in which useful data with a low bit significance have been periodically replaced by a frame marker, comprising: searching the serial data stream to find the bit pattern of the frame marker; after finding the bit pattern of the frame marker, dissecting the serial data stream into parallel partial data streams synchronous to the frame marker that was found in the searching step.

According to yet another aspect of the invention there is provided an arrangement for preparation of digital data for transmission, comprising: an analog to digital (A/D) converter for generating parallel partial data streams of different bit significance; a generator for generating a frame marker; and a control unit coupled to the A/D converter and to the generator for periodically replacing useful data in a partial data stream of low bit significance with the frame marker.

According to a still further aspect of the invention there is provided an arrangement for retrieval of digital data in a form of parallel partial data streams of different bit significance from a serial data stream in which useful data with a low bit significance have been periodically replaced by a frame marker, comprising: a demultiplexer for dissecting the serial data stream into parallel partial data streams of different bit significance; and a frame marker detector coupled to the demultiplexer for receiving a partial data stream of low bit significance and for detecting a frame marker in the partial data stream of low bit significance, the detector including means for generating a control signal for controlling the demultiplexer to operate synchronously with the frame marker detected by the frame marker detector.

The invention is based on the following findings. If data are present in the form of partial data streams of different bit significance, degradation of the data is smallest if errors in the useful signal occur only in a partial data stream of low bit significance, for example, in the LSB (least significant bit) partial data stream. If partial data streams of different bit significance are generated, for example, by an A/D converter, its resolution decreases as the bit significance decreases. The invention makes use of this by periodically replacing useful data in a partial data stream of low bit significance with a frame marker. In contrast to conventional methods, in which the bit rate increases for the transmission of an additional frame marker or in which a very complex multiplexer or demultiplexer is necessary during the retrieval of the data, the invention allows a simple synchronization without significant quality losses. If, for example, every 512th useful bit in a partial data stream of low bit significance is replaced by a frame marker bit, a simple demultiplexer can be used. This is in contrast to a solution in which a frame marker bit is added to multiples of 512 bits. A demultiplex formation down to single bits with subsequent remultiplex formation is not necessary. With the invention, standardized data rates can be fully utilized. Thus, for example, given the data rate of 5.4 GBit, 32 television channels with a width of 7 MHz can be transmitted.

The invention will now be explained in greater detail by way of illustrative embodiments which are illustrated in the accompanying drawings.

BRIEF DESCRIPTION OF THE DRAWINGS

FIG. 3 is a diagram of the frame structure for data transmission in accordance with the principles of the invention.

DETAILED DESCRIPTION OF THE PREFERRED EMBODIMENTS

Figure 1:
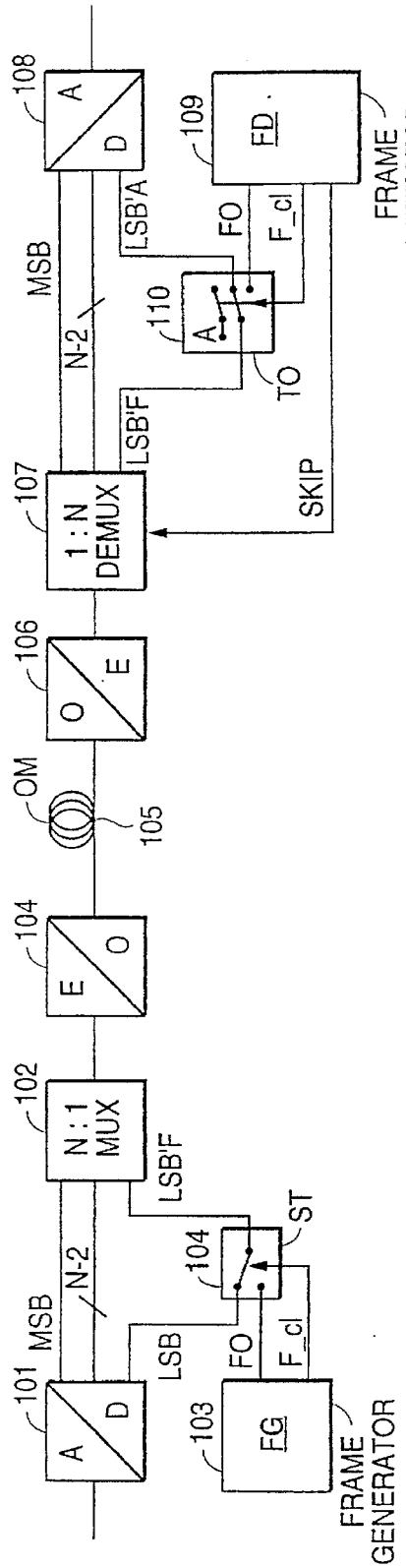
FIG. 1 is a block diagram of a data transmission system with data preparation and retrieval according to an embodiment of the invention.

The data transmission system according to the invention with transmitting-end data preparation and receiving-end retrieval is explained herein by way of the transmission of television channel signals or entire television channel signal bundles. Referring to FIG. 1, there is shown an analog-to-digital converter A/D (101) for converting the supplied television channel signals or television channel signal bundles to N parallel partial data streams of different bit significance, and if necessary, after individual frequency conversion for individual TV channels, which is advantageous to comply after D/A-conversion with standardized TV-channel frequency allocation plans. See for example German Patent documents DE 40 08 200 and 40 08 201. Of course, if data are already available in the form of parallel, digital partial data streams of different bit significance, then the A/D converter stage may be omitted. The partial data stream having the highest bit significance is identified by MSB (most significant bit) and the partial data stream having the lowest bit significance by LSB (least significant bit). There are N-2 further partial data streams disposed between the MSB and LSB partial data streams. The parallel partial data streams are combined by a multiplexer N:1 MUX (102) to form a serial data stream.

According to the invention, useful data are periodically replaced by a frame marker in at least one partial data stream of low bit significance, in the present example in the LSB partial data stream. For this purpose there is provided a generator FG (103) for the generation of such a frame marker F0 and a control unit ST (104) in the form of a switch controlled by a clock F_cl from generator FG (103). Control unit ST (104) switches the LSB signals through without a change in a first switch position. In a second switch position, the LSB bits are replaced periodically by the frame marker F0 from frame generator FG (103) to form the data sequence LSB'F which is forwarded to multiplexer N:1 MUX (102) in place of the partial data stream having the lowest bit significance.

As shown by the frame structure according to FIG. 3, every 16th LSB, namely L15, L31, L47, etc., is replaced by a frame marker F0, which, in this example, produces a 0101 . . . sequence, i.e. a signal alternating between two constant amplitudes. Each sequence, which is periodically embedded into a random sequence (useful data) as described, manifests itself as an interference in the form of a noise that does not cause an interference line in the spectrum. Therefore, the use of a simple frame marker is possible without restriction. Since the useful data are only distorted in the LSB partial data stream during their replacement by the frame marker, the degradation is minor because of the decreasing resolution given a decreasing bit significance.

In the embodiment of FIG. 1, following the combination of the partial data streams to a serial data stream in the N:1 MUX (102) the electrical signals are converted to optical signals in an electro-optical converter E/O (104) and transmission takes place via an optical medium OM (105), for example, a glass fiber transmission section or an optical distribution network. For example, 32 television channels having a bandwidth of 7 MHz can be transmitted at a bit rate of 5.4 GBit via such a transmission system or distribution system.

At the corresponding receiving-end, the optical signals are reconverted to electrical signals by an opto-electrical converter O/E (106). A demultiplexer 1:N DEMUX (107) is provided, which again dissects the serialized data stream into N parallel partial data streams of different bit significance and converts them back, if necessary, into analog television signals by a digital-to-analog (D/A) converter. This dissection takes place synchronously to the frame marking. For this purpose, the frame marker is extracted by a frame marker detector FD (109) which generates a corresponding control signal Skip for the demultiplexer 1:N (107).

In one embodiment of the invention, the frame marker is replaced by new data on the receiving end. For this purpose, a gate circuit TO (110) is provided which is controlled by a clock F_cl of the frame marker detector FD (109). Gate circuit TO (110) replaces the bit sequence LSB'F at the points L15, L31, L47, . . . by a bit sequence A. This bit sequence A can, for example, be comprised of a DC signal having a constant amlitude L. This DC signal leads to a lesser degradation in the total signal than the alternating signal of the frame marker.

Figure 2:
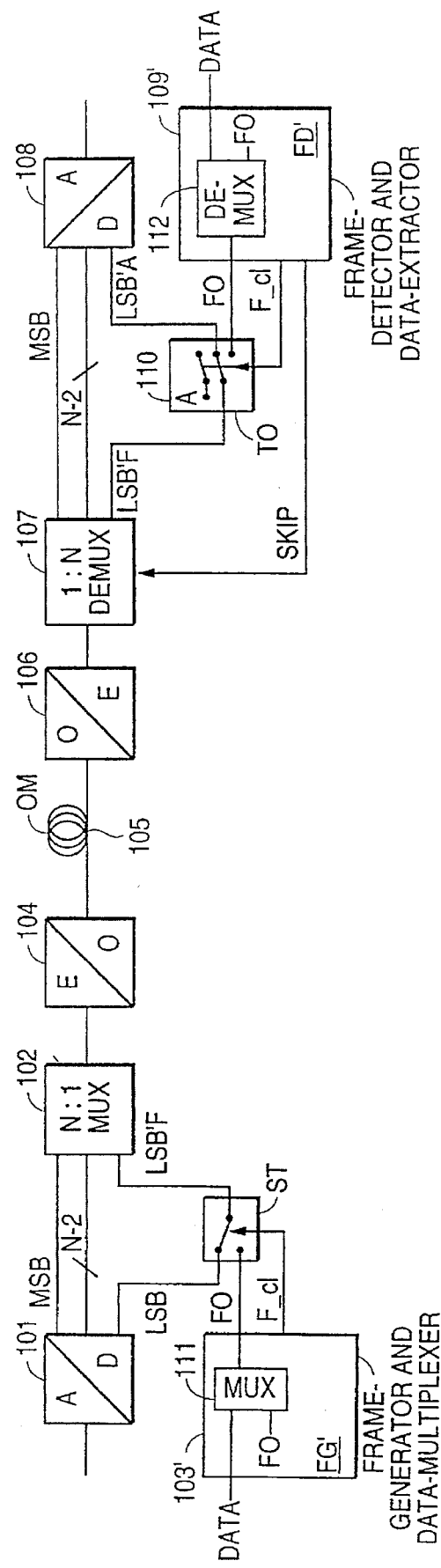
FIG. 2 is a block diagram of a data transmission system according to FIG. 1 with means for transmission of additional data according to a further embodiment of the invention.

Referring to FIG. 2, there is shown a block diagram of a further embodiment of the invention wherein further useful data (television signal portions) of a partial data stream having a low bit significance (which again in this embodiment is the LSB partial data stream for reasons of simplification), are replaced by additional data, e.g., overhead information, control information, etc. Blocks in FIG. 2 which are the same as in FIG. 1 are assigned the same reference numerals. As is shown by the frame structure according to FIG. 3, the LSB bit positions L7, L23, L39, etc., are replaced by the additional data i1, i2, i3, . . . . In order to insert these additional data into the LSB partial data stream, a generator FG' (103') is provided with a multiplexer MUX (111) for the generation of the frame marker. Multiplexer MUX (111) replaces respectively 2 of 16 LSB's, on the one hand, by the additional data i1, i2, i3, . . . and by the frame marker on the other hand. On the receiving end, a corresponding demultiplexer DEMUX (112) is provided in the frame marker detector FD' (109') by means of which the additional data is extracted.

In FIGS. 1 and 2, if N=12, for example, so that there are 12 partial data streams, a 12:1 multiplexer VS8001 by "Vitesse Semiconductor Corporation" can be used as the N:1 MUX (102). The inputs for the 12 partial data streams of this multiplexer module VS8001 are designated as D0 to D11, with the LSB being fed at D0. The clock signal for D0 to D11 is identified as D clock. All integrated modules described hereinafter can be selected from the Motorola MC10HXXX series.

Figure 4:
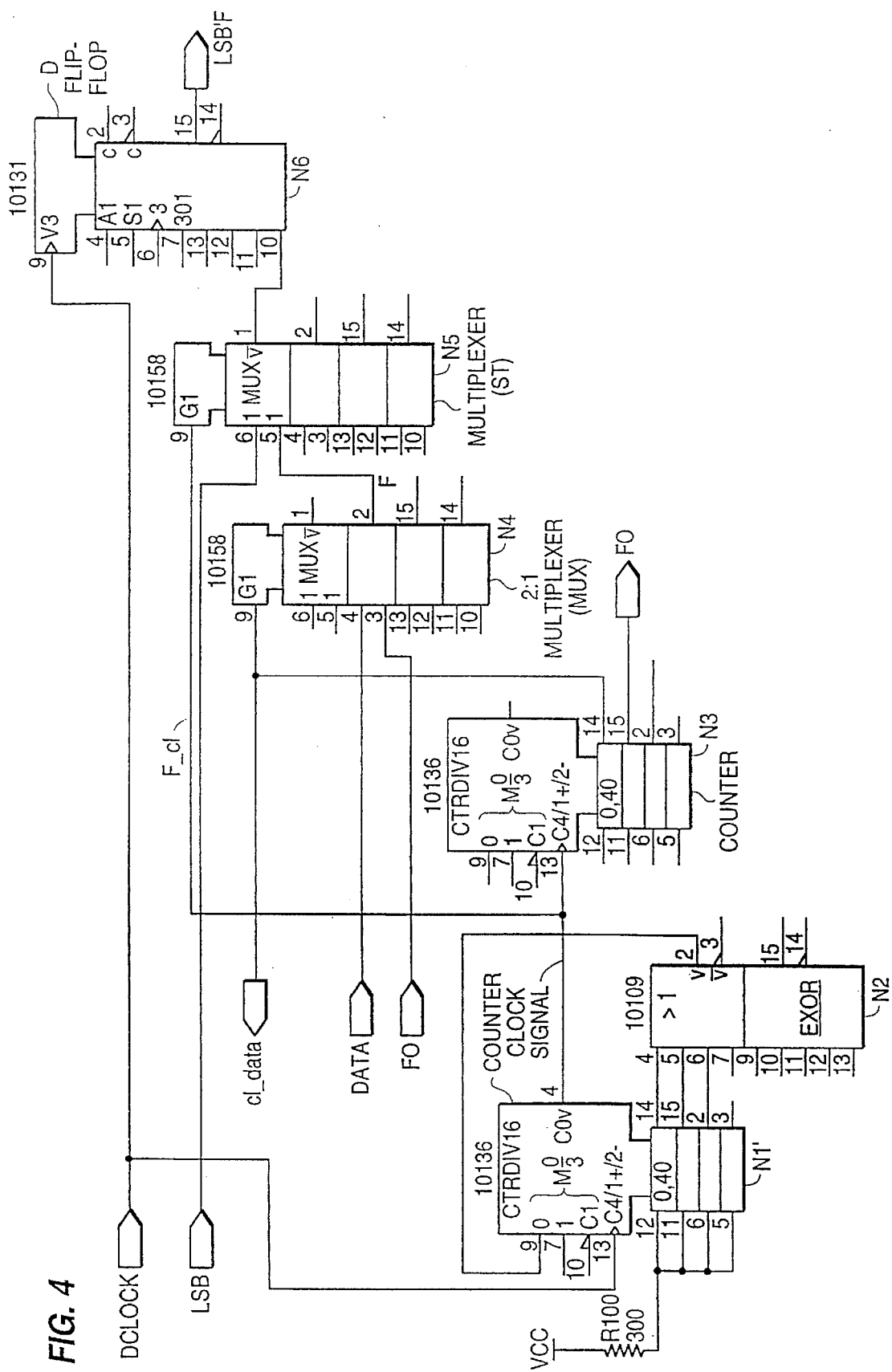
FIG. 4 is a circuit diagram of a transmitting-end frame generator and multiplexer which can be used for implementing the invention.
Figure 5:
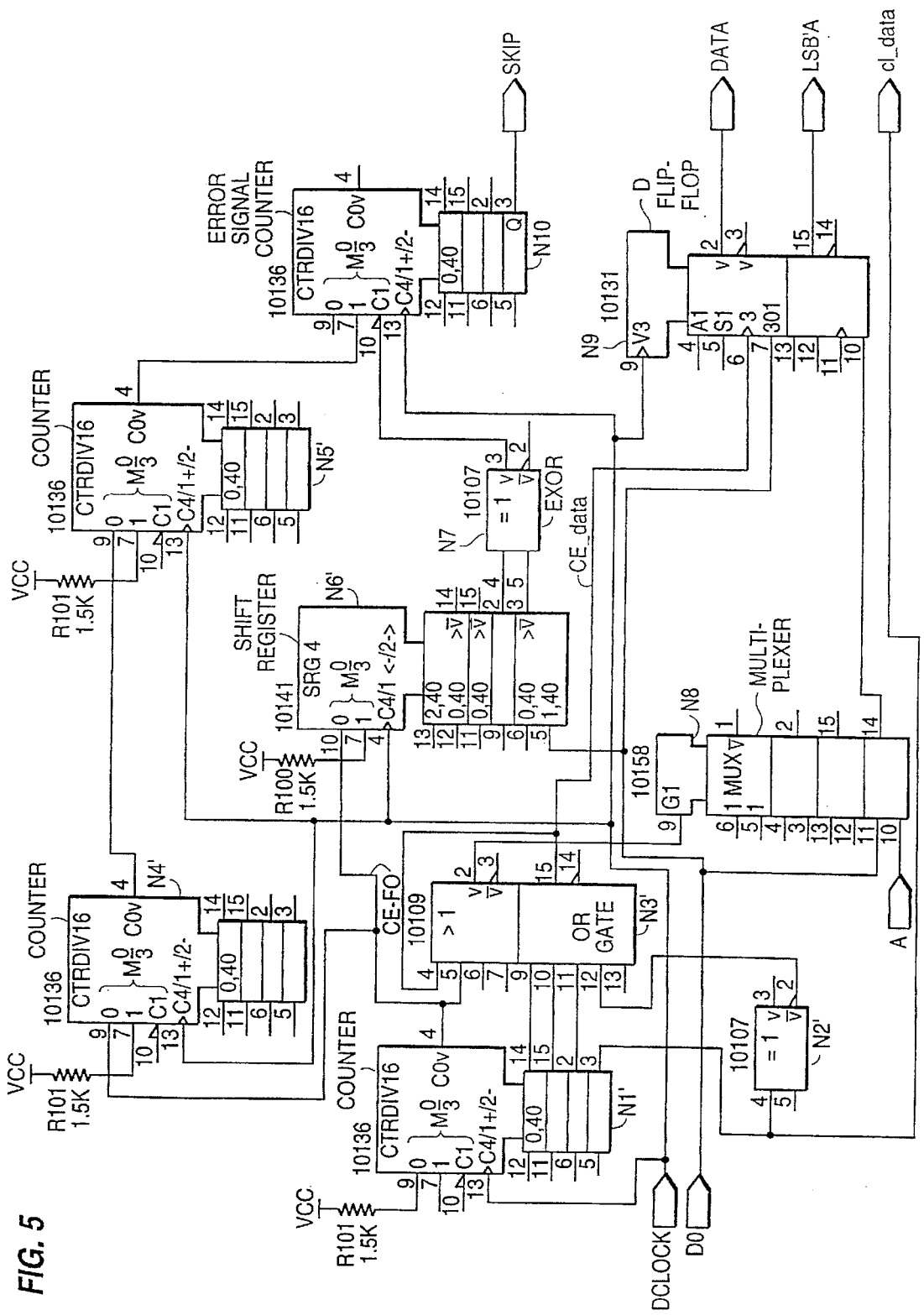
FIG. 5 is a circuit diagram of a receiving-end frame detector and means for data retrieval which can be used for implementing the invention.

FIGS. 4 and 5 show examples of hardware embodiments for, respectively, generator FG' with 2:1 multiplexer MUX, and frame marker detector FD' with 1:2 demultiplexer DEMUX as depicted in the embodiment shown in FIG. 2.

Referring to FIG. 4, the 2:1 multiplexer N4 (corresponding to the frame generator FG' MUX) alternatingly selects an additional data bit and a frame marker bit F0. A downstream 2:1 multiplexer N5 corresponds to control unit ST in FIG. 2 and replaces every eighth bit in the LSB partial data stream by the output signal of N4. The clock control of N4 and N5 is derived from the D clock signal with the aid of hexadecimal counters N1 and N3. Counter N1 and the EXOR gate N2 supply a clock signal D clock divided by the factor 1:8. The control signal F_cl at the output CO of counter N1 is 'high' during 7 clock steps of D clock and 'low' for one D clock step. The control signal F_cl controls multiplexer N5. A further reduction of the clock rate by the factor 2 with the use of counter N3 leads to a switching signal for N4. A renewed division of the clock rate by the factor 2 supplies the frame marker codeword or sequence F0. A delay of the LSB partial data stream by a clock step D clock takes place via a D flip-flop N6. The same delay is also required for all other data fed to multiplexer N:1 MUX (102) (FIG. 1), for example, with corresponding D flip-flops. At the output of D flip-flop N6, the signal LSB'F appears, which is forwarded to multiplexer N:1 MUX (108) shown in FIG. 1.

At the the receiving-end, serial to parallel conversion is carried out by means of a 1:N DEMUX (102) according to the FIGS. 1 and 2. With N=12, for example, a 1:12 demultiplexer VS8002 by "Vitesse . . . " can be used. The pin assignment for the partial data streams is again identified as D0 to D11, with the LSB partial data stream appearing at the output D0. This demultiplexer is provided with a Skip control input for triggering the demultiplexer such that a word shift by one bit with respect to the serialized 5.4 Gbit data stream can take place.

The input signals for frame marker detector FD' are the output signals D0 and D clock of demultiplexer 1:N DEMUX VS8002. After frame synchronization is established, the LSB'F signal appears at the D0 output of demultiplexer 1:N DEMUX (107). For the frame marker detector FD' with associated gate circuit TO (110), integrated modules of the Motorola MC10XXX series can again be used. The frame marker detector FD' detects the frame marker F0=1010 . . . , extracts the additional data i1, i2, i3 according to FIG. 3 and supplies the skip signal for the demultiplexer 1:N DEMUX VS8002 as well as the clock F_cl for gate circuit TO.

As shown in FIG. 5, the counter N1' and the OR gate of N3' generate two clock 'enable' signals CE_data and CE_F0, which respectively, are 'low' once every 16th bit of the partial data stream D0. CE_data is 'low' at bit position 7; CE_F0 is 'low' at bit position 15 (FIG. 3). In case of frame synchronization, CE_data therefore permits the extraction of the useful data 'data' by using the D flip-flop N9, and CE_F0 serves to search for the frame marker bits F0 by using the shift register N6':

If the shift register N6' contains the frame marking bits 1010 . . . , the output of the EXOR gate N7 constantly carries 'high' potential and the count of the downstream error signal counter N10 does not change. The Skip signal can be tapped at one of the outputs of the error signal counter N10, e.g., Q3. Once within the 16×64 clock cycles of D clock, the error signal counter N10 is set back to the value '0000'. The Skip signal then remains 'low'.

If the shift register N6' contains random bits, the output of the EXOR gate N7 carries 'low' potential with a probability of 0.5. Statistically, the counter N10 is therefore incremented after every second D clock step. The output signal at Q3, i.e., the Skip signal, changes its sign after every 8 increments and thus supplies trigger pulses for the serial data stream having a high bit rate, which causes a word rotation (that is a shifting of the data by one bit per each trigger pulse) in the demultiplexer VS8002. This search process for the frame marker repeats itself until the shift register N6' has found the correct frame marker and frame synchronization is thus achieved.

The maximum number of skips until reaching a frame synchronization amounts to: 16×12=192 for the previously described frame marker and the described frame marker detector.

After synchronization has been achieved, transmission errors can simulate incorrect frame markers. This would lead to erroneous incrementing of error signal counter N10. To avoid the synchronous loss due to a gradual accumulation of simulated frame marker errors, demultiplexer 1:N DEMUX is only synchronized anew by the Skip signal when the frame marker has been received incorrectly several times. This is why the error signal counter N10 is only set back to the value 0000 once during 16×64 D clock steps. The signal for this resetting is derived from the D clock signal counters N4 and N5.

The multiplexer N8 is provided for the replacement of the frame marker by useful data, —AC—free bit sequence A on 'low' potential, as described above. The temporally correct integration of this bit sequence A (compensation of delay through the D flip-flop at the receiving end) is achieved via the D flip-flop N9 which supplies the bit sequence LSB'A.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method of preparing digital data for transmission, comprising:

providing the digital data in a form of parallel partial data streams of different bit significance; and periodically replacing useful data in at least one partial data stream of low bit significance with a frame marker.

2. The method according to claim 1, wherein the digital data comprises television channel signals or television channel signal bundles.

3. The method according to claim 1, including combining the partial data streams to form a serial data stream.

4. A method of retrieving digital data in a form of parallel partial data streams of different bit significance from a serial data stream in which useful data with a low bit significance have been periodically replaced by a frame marker, comprising:

searching the serial data stream to find the bit pattern of the frame marker; and after finding the bit pattern of the frame marker, dissecting the serial data stream into parallel partial data streams synchronous to the frame marker that was found in said searching step.

5. The method of claim 4, wherein the digital data is digitized television channel signals or television channel signal bundles.

6. The method as according to claim 4, further comprising replacing further useful data, apart from the useful data replaced by the frame marker, in at least one partial data stream that also has a low bit significance with additional data.

7. The method according to claim 6, alternately and periodically replacing useful data in at least one partial data stream of low bit significance by the frame marker and the additional data.

8. The method according to claim 1, wherein the frame marker of said replacing step comprises a periodic bit sequence.

9. An arrangement for preparation of digital data for transmission, comprising:

an analog to digital (A/D) converter for generating parallel partial data streams of different bit significance;

a generator for generating a frame marker; and a control unit coupled to said A/D converter and to said generator for periodically replacing useful data in a partial data stream of low bit significance with the frame marker.

10. The arrangement according to claim 9, wherein the digital data comprises digitized television channel signals or television channel signal bundles.

11. The arrangement according to claim 10, further comprising a multiplexer connected to said A/D converter and to said control unit for serializing the parallel partial data streams.

12. An arrangement for retrieval of digital data in a form of parallel partial data streams of different bit significance from a serial data stream in which useful data with a low bit significance have been periodically replaced by a frame marker, comprising:

a demultiplexer for dissecting the serial data stream into parallel partial data streams of different bit significance; and a frame marker detector coupled to said demultiplexer for receiving a partial data stream of low bit significance and for detecting a frame marker in the partial data stream of low bit significance, said detector including means for generating a control signal for controlling said demultiplexer to operate synchronously with the frame marker detected by said frame marker detector.

13. The arrangement according to claim 12, wherein the digital data is digitized television channel signals or television channel signal bundles.

14. The arrangement according to claim 13, further comprising a gate circuit coupled between said demultiplexer and said frame detector for receiving the partial data stream of low bit significance from said demultiplexer and being controlled by said frame marker detector for substituting the frame marker with useful data.

15. The arrangement according to claim 9, wherein said generator includes means for replacing useful data in a partial data stream of low bit significance with additional data.

16. The arrangement according to claim 12, wherein useful data apart from the useful data replaced by the frame marker has been replaced in at least one partial data stream that also has a low bit significance with additional data, said frame marker detector further comprising means for extracting the additional data in the partial data stream of low bit significance.

17. The arrangement according to claim 12, wherein said means for generating the control signal for the demultiplexer is configured so that after the frame marker has been detected, the demultiplexer is only synchronized anew by the control signal when the frame marker has been received defectively several times.

* * * * *